United States Patent [19]

Kelbel

[11] 4,228,693
[45] Oct. 21, 1980

[54] TRANSMISSION SHIFT CONTROL APPARATUS

[75] Inventor: Donald W. Kelbel, Muncie, Ind.

[73] Assignee: Borg-Warner Corporation, Chicago, Ill.

[21] Appl. No.: 968,058

[22] Filed: Dec. 11, 1978

[51] Int. Cl.[2] .......................... F16H 3/38; G05G 5/10; G05G 9/12
[52] U.S. Cl. ........................................ 74/339; 74/359; 74/473 R; 74/476; 74/477
[58] Field of Search ...................... 74/339, 359, 473 R, 74/476, 477

[56] References Cited

U.S. PATENT DOCUMENTS

| | | | |
|---|---|---|---|
| 3,164,030 | 1/1965 | Fodrea et al. | 74/476 |
| 3,202,005 | 8/1965 | Ivanchich | 74/333 |
| 3,554,047 | 1/1971 | Stott | 74/477 |
| 3,866,488 | 2/1975 | Nakata et al. | 74/475 |
| 3,929,029 | 12/1975 | Kelbel | 74/473 R |

OTHER PUBLICATIONS

"1975 Car Shop Manual", Ford Motor Company, pp. 16-28-11 through 16-28-8, and 16-29-1 through 16-29-11, 1st Printing-Jan. 1975.

*Primary Examiner*—Allan D. Herrmann
*Attorney, Agent, or Firm*—Julian Sachner

[57] ABSTRACT

Shift control apparatus for a multiple speed sliding gear manual transmission is characterized by the provision of a main shift rail which is rotatable for crossover selection and axially slidable for engagement of the selected gear. An auxiliary shift rail is axially slidable for engagement of an auxiliary gear and a reverse idler gear is axially slidable for engagement of reverse. Linkage is provided for sliding the auxiliary shift rail in one direction upon axial sliding movement of the main shift rail in a first direction and for sliding the reverse idler gear in the same one direction upon axial sliding movement of the main shift rail in a second direction. The linkage prevents inadvertent sliding movement of the reverse idler gear. There is also provided an inhibiting device for preventing engagement of reverse inadvertently.

14 Claims, 10 Drawing Figures

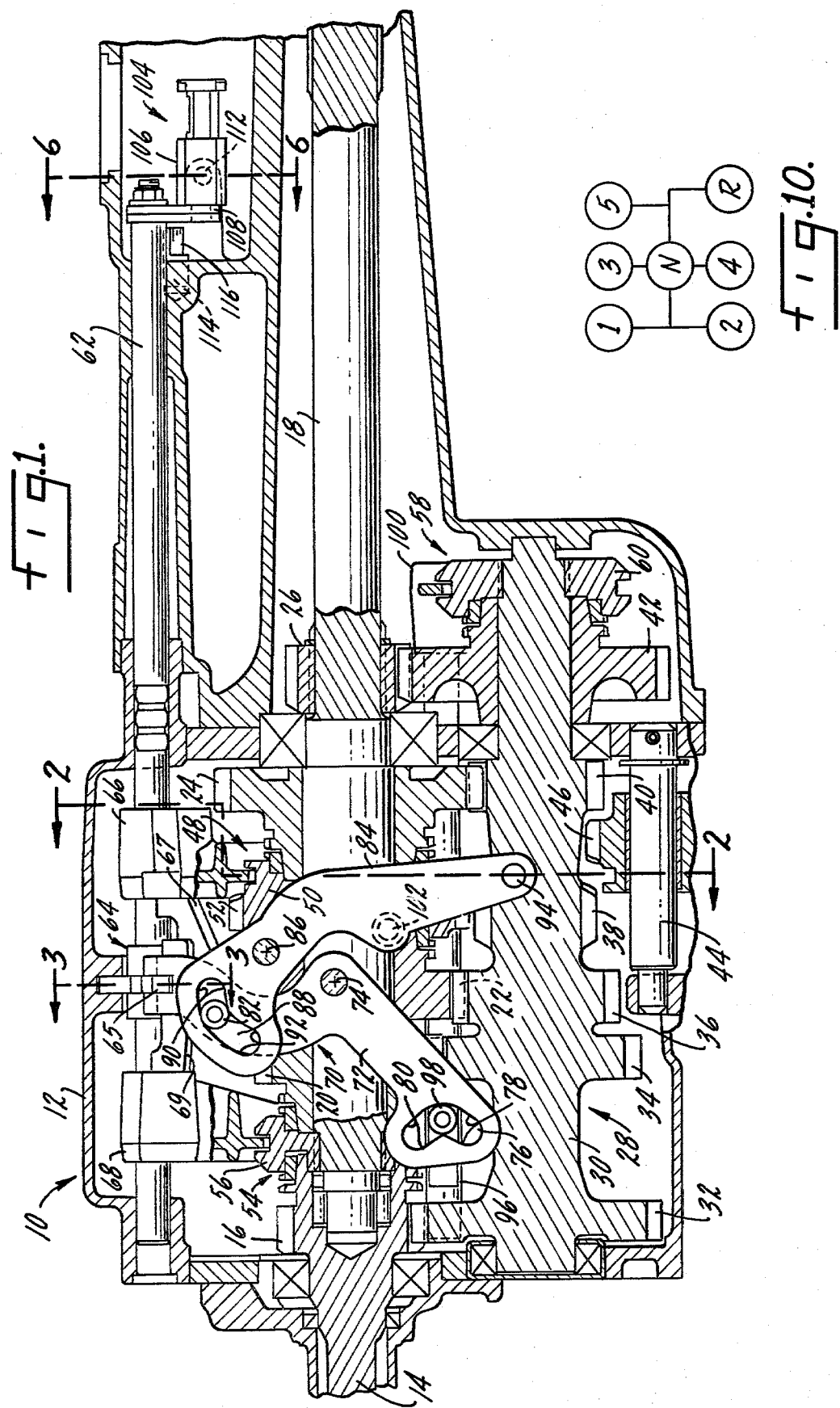

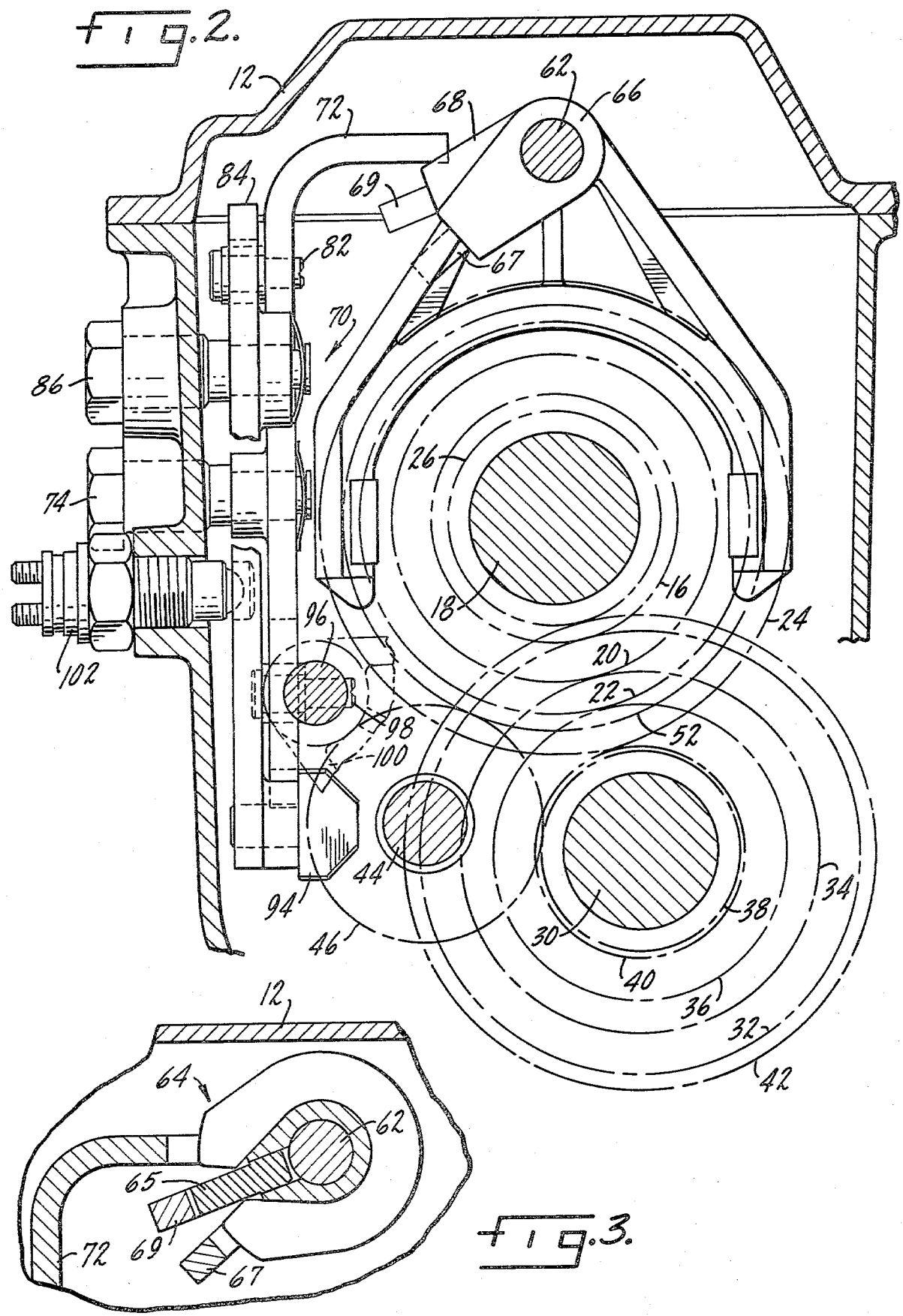

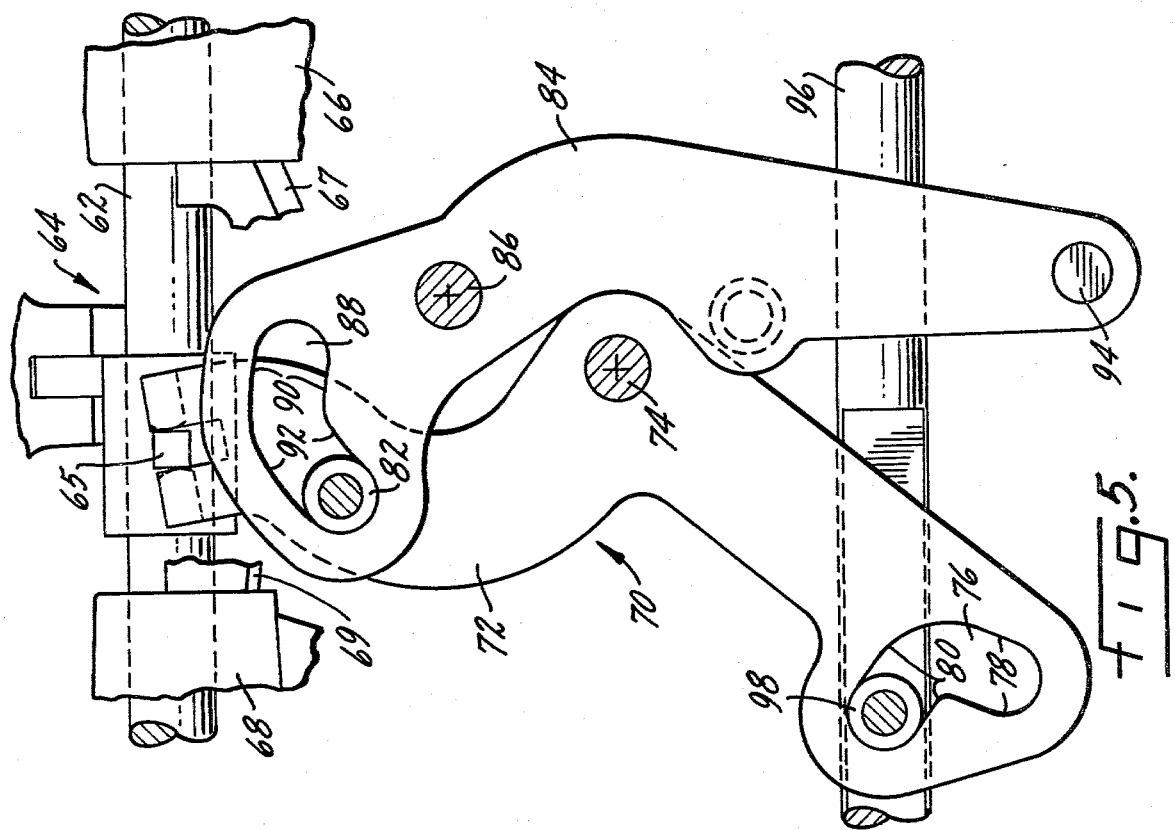
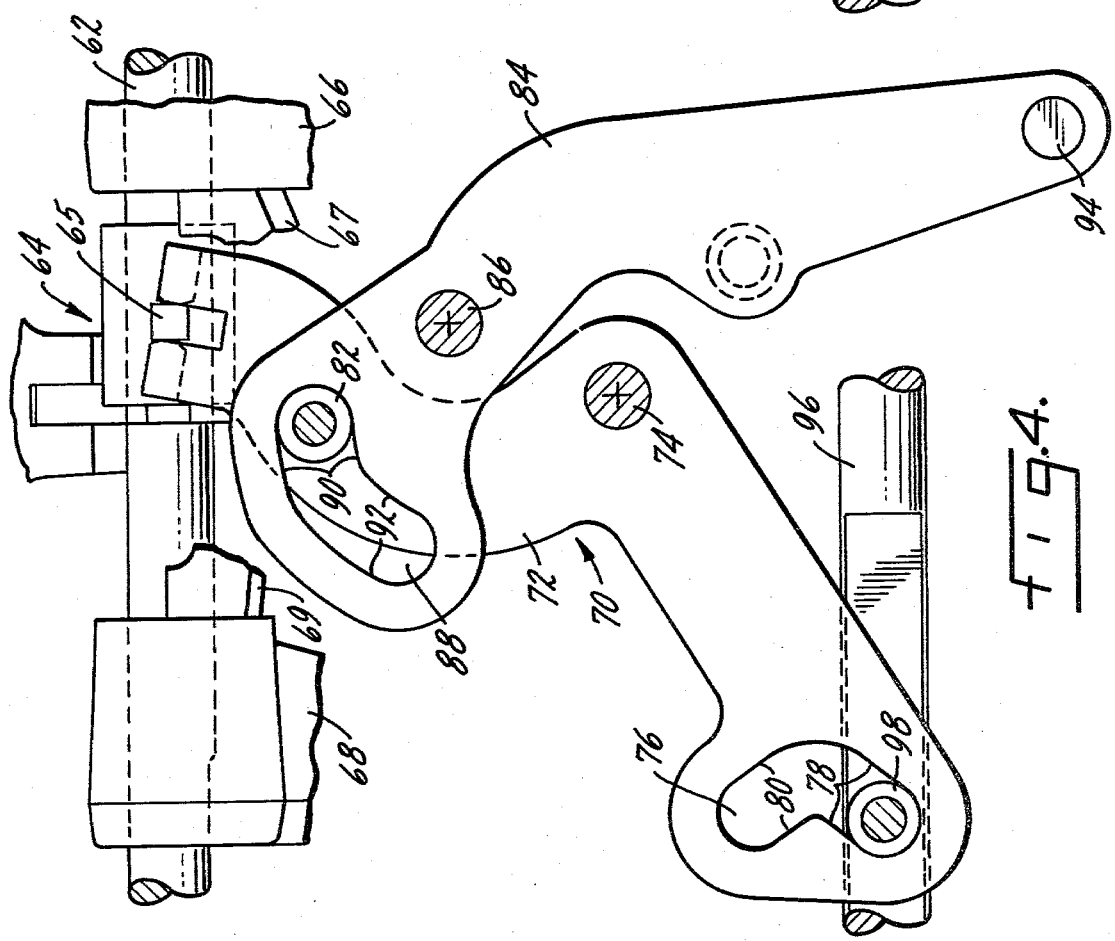

TRANSMISSION SHIFT CONTROL APPARATUS

BACKGROUND OF THE INVENTION

This invention relates generally to the control of an automotive transmission or the like. More particularly, it relates to improved shift control apparatus for a multiple speed, sliding gear manual transmission.

In recent years there have been many improvements in automotive drive trains, including improvements relating to control apparatus for shifting manual transmissions. Generally, for transmissions incorporating five forward speed ratios and a reverse speed ratio, the shift control apparatus provides three crossover positions for the shift stick. Each crossover position selects an appropriate shift fork, which may be moved longitudinally to engage two gear ratios. Thus, of the three crossover positions the first selects the first and second forward speed ratios, the second selects the third and fourth forward speed ratios, and the third selects the fifth forward and reverse speed ratios. Because longitudinal movement of the same shift fork in opposite directions engages either fifth or reverse, it is possible that reverse may be engaged inadvertently during the five-four downshifting operation. To prevent inadvertent reverse engagement, prior shift control apparatus has been designed to require that the shift stick be moved upwardly or downwardly before shifting into reverse, or alternatively that a special lever be moved prior to movement of the shift stick to engage reverse. Such apparatus has the disadvantage of involving complicated mechanisms and requiring some operator skill in the shifting operation.

Other prior apparatus is disclosed in U.S. Pat. No. 3,866,488 issued Feb. 18, 1975. As disclosed therein, three longitudinally movable shafts are selectively engageable by crossover movement of a shift stick. Longitudinal movement of the gear shift stick causes longitudinal movement of the selected shaft for effecting engagement of the appropriate gear. An inhibiting mechanism incorporating a single spring is provided to indicate the position of the shift stick vis-a-vis the five-reverse shaft. One disadvantage of this arrangement is that it requires the use of another shaft and the interlock in order to prevent an inadvertent shift into reverse. Another disadvantage of this arrangement is that the signal provided by the inhibiting mechanism may not be adequate.

Still other prior apparatus is disclosed in U.S. Pat. No. 3,929,029 issued Dec. 30, 1975. As disclosed therein, first and second shift rails are connected by a linkage mechanism. A shift stick is connected to the first shift rail such that movement in one direction causes rotation and movement in another direction causes longitudinal sliding of this shift rail. Motion of the first shift rail is transmitted through the linkage mechanism to the other shift rail so as to provide opposite rotation and longitudinal sliding thereof. One disadvantage of this arrangement is that it results in a shift pattern which is at variance with the shift pattern generally accepted in the automotive industry.

SUMMARY OF THE INVENTION

A primary object of this invention is to overcome the disadvantages noted above. Top that end, there is provided shift control apparatus which may be incorporated in a multiple speed, sliding gear manual transmission having, for example, five fully synchronized forward gear ratios and a reverse gear ratio.

A main shift rail is rotatable about its longitudinal axis to four positions for crossover selection. In each of these positions the main shift rail is slidable longitudinally along its axis so as to engage the selected gear ratio. In the first position, the main shift rail is slidable to engage either the first or second forward gear ratio. In the second position, the main shift rail is slidable to engage either the third or fourth forward speed ratio. In the third and fourth positions, the main shift rail is slidable to engage either the fifth forward or reverse gear ratio.

An auxiliary shift rail is slidable to establish fifth, and a reverse idler gear is slidable to establish reverse. The auxiliary shift rail and the reverse idler gear are coupled with the main shift rail by a linkage mechanism. The mechanism is effective to move the auxiliary shift rail in a gear-engaging direction upon movement of the main shift rail in one direction, while at the same time preventing movement of the reverse idler gear. The linkage mechanism also is effective to move the reverse idler gear in the same gear-engaging direction upon movement of the main shift rail in the opposite direction, while at the same time preventing movement of the auxiliary shift rail.

Crossover selection is accomplished by pivoting a crank member secured to the main shift rail. The crank member is pivotal between a one-two crossover position, an intermediate three-four crossover position and two five-reverse crossover positions. A fixed overtravel stop prevents excessive overtravel of the crank member beyond the one-two position. A dual inhibiting device yielding resists crossover movement from the three-four position to one five-reverse position with a relatively light force. The device yieldably resists slight additional movement to the other five-reverse position with a relatively heavy force, and prevents excessive overtravel beyond the five-reverse position. Another fixed stop blocks longitudinal movement of the crank member and main shift rail in the reverse gear-engaging direction until the crank member is pivoted to the other five-reverse position against the heavy resisting force.

BRIEF DESCRIPTION OF THE DRAWINGS

The objects and advantages of this invention will become apparent to those skilled in the art upon careful consideration of the specification herein, including the drawings, wherein:

FIG. 1 is a sectional view of the transmission showing the overall relationship of the components. The gears have been revolved into the plane of the paper for clarity;

FIG. 2 is a sectional view taken along the line 2—2 of FIG. 1 showing details of the shift control apparatus. Some structure has been simplified or omitted for clarity;

FIG. 3 is a sectional view taken along the line 3—3 of FIG. 1 showing details of the selector mechanism. Some structure has been omitted for clarity;

FIG. 4 is a partial sectional view similar to FIG. 1 showing another position of the linkage mechanism;

FIG. 5 is a partial sectional view similar to FIG. 1 showing still another position of the linkage mechanism;

FIG. 10 is a diagrammatic view illustrating the shift pattern as seen by an operator.

Figure 6:
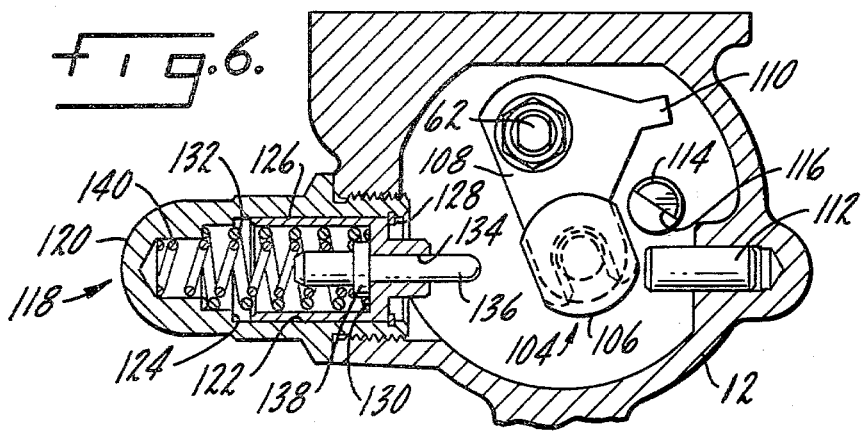
FIG. 6 is a sectional view taken along the line 6—6 of FIG. 1 showing details of the crank and inhibiting mechanisms.

While this invention is susceptible of embodiment in many different forms, there is shown in the drawings and herein will be described in detail a preferred embodiment. It should be understood that the present disclosure is considered to be an exemplification of the principles of the invention and is not intended to limit the invention to this embodiment.

DESCRIPTION OF THE PREFERRED EMBODIMENT

Referring now to the drawings in greater detail, there is shown generally a multiple speed, sliding gear manual transmission 10 adapted for use in an automotive vehicle. Transmission 10 includes a transmission housing 12. An input shaft 14 is journalled in housing 12 and is adapted to receive torque from an associated engine through an appropriate clutch. Input shaft 14 defines an input gear 16.

An output shaft in the form of a mainshaft 18 is journalled in housing 12. Output gears 20, 22, and 24 are journalled on mainshaft 18. An output gear 26 is defined by or secured to mainshaft 18.

A cluster gear 28 includes a countershaft 30 journalled in housing 12. Defined by or secured to countershaft 30 is a drive gear 32 in mesh with input gear 16. Similarly, there are provided a countershaft gear 34 in mesh with output gear 20, a countershaft gear 36 in mesh with output gear 22, a countershaft gear 38, and a countershaft gear 40 in mesh with output gear 24. In addition, a countershaft gear 42 is journalled on countershaft 30 and is in mesh with output gear 26.

A reverse idler shaft 44 is supported in housing 12. A reverse idler gear 46 is journalled on shaft 44 and is slidable relative thereto.

A synchronizing clutch 48 is supported by main shaft 18 between gears 22 and 24. Clutch 48 includes a collar 50 which defines an output gear 52. Gears 38 and 52 are in alignment when collar 50 is in its central position, such that reverse idler gear 46 is slidable into and out of mesh with them. A synchronizing clutch 54 is supported by mainshaft 18 between gears 16 and 20. Clutch 54 includes a collar 56.

A synchronizing clutch 58 is supported at one end of countershaft 30. Clutch mechanism 58 includes a collar 60.

Movement of collar 50 rearwardly (rightwardly as shown in FIG. 1) locks gear 24 to mainshaft 18, thereby establishing the first forward gear ratio. Movement of collar 50 forwardly (leftwardly as shown in FIG. 1) locks gear 22 to mainshaft 18, thereby establishing the second forward gear ratio. Similarly, rearward or forward movement of collar 56 respectively locks gear 20 or gear 16 to mainshaft 18, thereby establishing the third or fourth forward gear ratio. In addition, forward movement of collar 60 locks gear 42 to countershaft 30, thereby establishing the fifth forward gear ratio. Also, forward movement of reverse idler gear 46 into mesh with gears 38 and 52 establishes the reverse gear ratio.

A main shift rail 62 is supported in housing 12 for rotation about and longitudinal sliding movement along its own axis. A suitable crossover selector mechanism 64 is associated with shift rail 62. Suitable shift forks 66 and 68 also are associated with shift rail 62, selector mechanism 64, and respectively with synchronizing clutches 48 and 54. Selector mechanism 64 and shift forks 66 and 68 may be, for example, of the type disclosed in the aforementioned U.S. Pat. No. 3,929,029.

A linkage assembly 70 includes a first drive lever 72 pivotally supported on a fulcrum in the form of a bolt 74 extending inwardly of housing 12. Lever 72 defines a first cam slot 76. Cam slot 76 has as one portion thereof suitable wedging surfaces 78 and as another portion thereof surfaces 80. Surfaces 80 are arcuate and have a center of curvature on fulcrum 74. Lever 72 also defines a cam follower in the form of a roller 82.

Linkage assembly 70 also includes a second, follower lever 84 pivotally supported on a fulcrum in the form of a bolt 86 extending inwardly of housing 12. Lever 84 defines a second cam slot 88. Cam slot 88 has as one portion thereof arcuate surfaces 90 with a center of curvature on fulcrum 74 of lever 72 when linkage assembly 70 is in the positions shown in FIGS. 1 and 4. Cam slot 88 has as another portion thereof wedging surfaces 92 with a center of curvature offset from fulcrum 86. As best shown in FIG. 2, a suitable pad 94 extends from lever 84 into driving relationship with reverse idler gear 46.

A second, auxiliary shift rail 96 is supported in housing 12 for longitudinal sliding movement along its own axis. A cam follower in the form of a roller 98 is carried by shift rail 96 and extends into cam slot 76 of lever 72. A shift fork 100 also is carried at one end of shift rail 96 and is in driving relationship with collar 60 of synchronizing clutch 58.

Main shift rail 62 is rotatable between first, second, third, and fourth crossover positions. In the first two positions, selector mechanism 64 is in alignment respectively with shift forks 66 and 68. In both the third and fourth positions, the selector mechanism is in alignment with lever 72. Once crossover selection has been made, longitudinal movement of shift rail 62 will engage the selected gear.

In the first crossover position, rearward movement of shift rail 62 moves shift fork 66 rearwardly to engage the first gear ratio. Similarly, forward movement of shift rail 62 moves shift fork 66 forwardly to engage the second gear ratio. In the second crossover position, rearward or forward movement of shift rail 62 respectively moves shift fork 68 rearwardly or forwardly to engage the third or fourth gear ratio.

In the third crossover position, rearward movement of shift rail 62 pivots lever 72 clockwise about fulcrum 74 from the intermediate position shown in FIG. 1 to the first extreme position shown in FIG. 4. Wedging surfaces 78 of cam slot 76 wedge roller 98 forwardly. Shift rail 96 and shift fork 100 are moved forwardly, and synchronizing clutch 58 engages the fifth gear ratio. Due to the fact that surfaces 90 of cam slot 88 have a center of curvature on fulcrum 74, clockwise pivoting of lever 72 does not cause pivotal movement of lever 84 about fulcrum 86. On the contrary, lever 84 remains locked and cannot pivot.

In the fourth crossover position, forward movement of shift rail 62 pivots lever 72 counterclockwise about fulcrum 74 from the intermediate position shown in FIG. 1 to the second extreme position shown in FIG. 5.

Roller 82 moves into wedging contact with surfaces 92 of cam slot 88, thereby pivoting lever 84 clockwise about fulcrum 86 from the third extreme position shown in FIG. 1 to the fourth extreme position shown in FIG. 5. Pad 94 carries reverse idler gear 46 forwardly into mesh with gears 38 and 52 to engage the reverse ratio. At the same time, lever 84 actuates a conventional reverse light switch 102. Relative movement of roller 98 into the portion of cam slot 76 defined by surfaces 80 does not move shift rail 96 forwardly, as the center of curvature of surfaces 80 is on fulcrum 74.

Thus it will be seen that rearward movement of shift rail 62 in the third crossover position causes forward movement of sychronizing clutch 58 to engage the fifth gear ratio. Forward movement of shift rail 62 in the fourth crossover position causes forward movement of reverse idler gear 46 to engage the reverse ratio. This provides the shift pattern shown diagrammatically in FIG. 10.

A crank 104 includes a crank arm 106 and a plate 108 secured to shift rail 62. Plate 108 has a tab 110 extending therefrom. A suitable shift stick (not shown) extends through an opening in housing 12 into engagement with arm 106. Crossover movement of the shift stick causes pivotal movement of crank 104 about the axis of shift rail 62. This in turn rotates shift rail 62 on its own axis.

Figure 7:
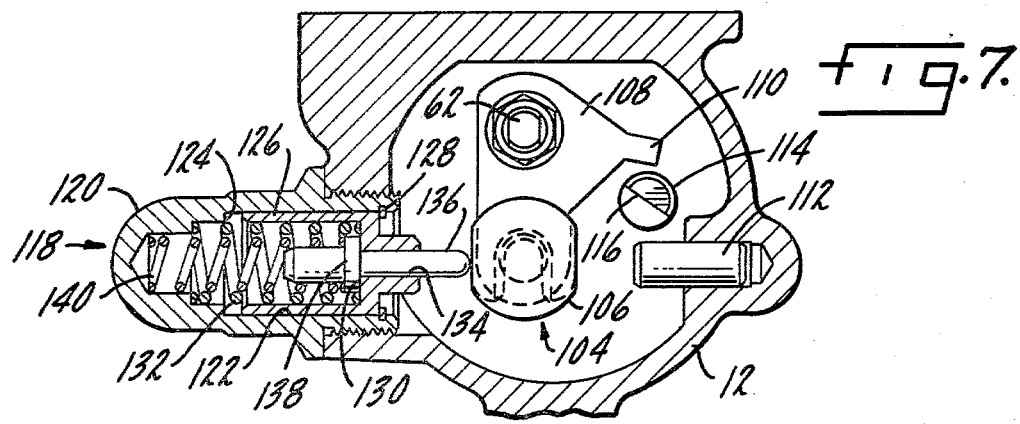
FIG. 7 is a sectional view similar to FIG. 6 showing another position of the crank and inhibiting mechanism.
Figure 8:
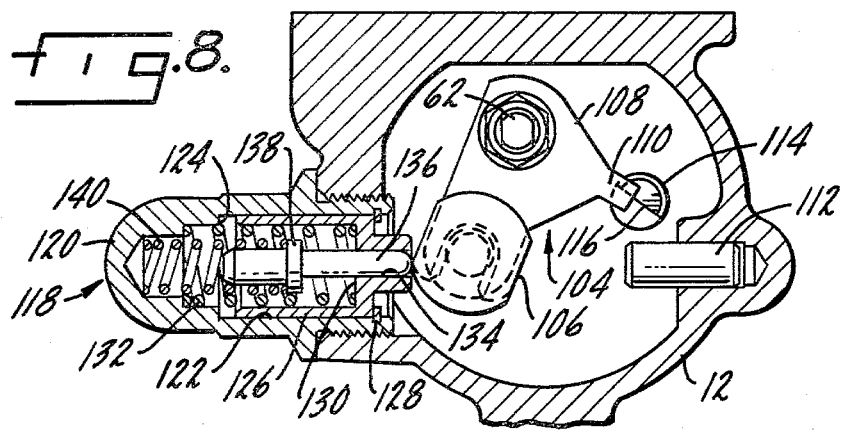
FIG. 8 is a sectional view similar to FIG. 6 showing still another position of the crank and inhibiting mechanisms.
Figure 9:
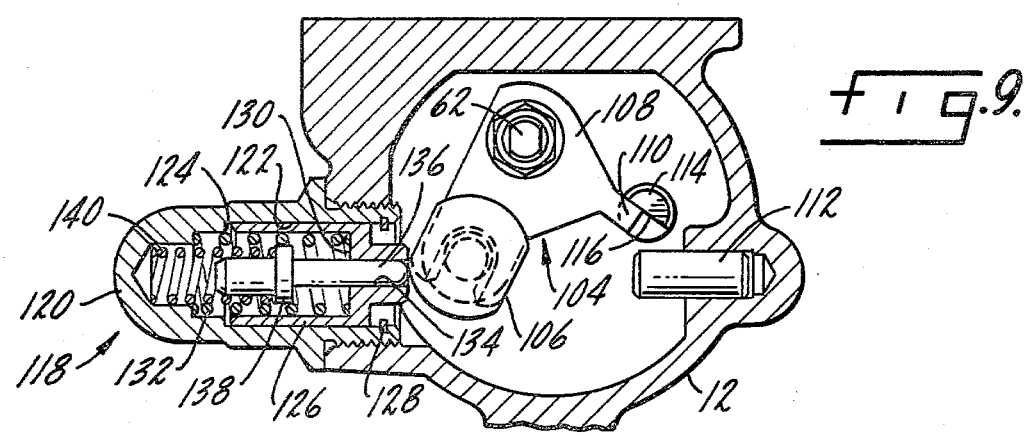
FIG. 9 is a sectional view similar to FIG. 6 showing yet another position of the crank and inhibiting mechanisms.

Crank 104 is pivotal between a first crossover position shown in FIG. 6, a second crossover position shown in FIG. 7, a third crossover position shown in FIG. 8, and a fourth crossover position shown in FIG. 9. In the first position, finger 65 of selector mechanism 64 is in alignment with shift fork 66. In the second position, finger 65 is in alignment with shift fork 68. In the third and fourth positions, finger 65 is in alignment with lever 72 of linkage 70.

A pin 112 extends from housing 12 and is oriented so as define an overtravel stop which prevents excessive overtravel of crank 104 beyond the first crossover position shown in FIG. 6. Finger 65 remains in alignment with shift fork 66 when arm 106 abutts pin 112. A pin 114 extends from housing 12 and defines a flat surface 116. In the third position of crank 104, tab 110 is in alignment with pin 114. In this position, forward movement of shift rail 62 is blocked, and shift rail 62 may move only in the rearward direction to cause engagement of the fifth gear ratio. Slight additional movement pivots crank 104 to the fourth crossover position, shown in FIG. 9. In this position tab 110 abutts and slides along flat surface 116 as shift rail 62 is moved forwardly to cause engagement of the reverse gear ratio. This slight additional crossover travel to allow the shift into reverse is shown diagrammatically in FIG. 10.

A dual inhibiting device 118 includes a housing 120 rigidly secured to housing 12 so as to become part thereof. Housing 120 defines a stepped bore 122 having transverse surface 124. A first plunger 126 is slidable in bore 122. Surface 124 and a suitable snap ring 128 define stops to limit the travel of plunger 126. Plunger 126 defines a surface 130 against which a spring 132 bears so as to bias piston 126 inwardly against stop 128. Spring 132 develops a relatively heavy biasing force.

Plunger 126 also defines a bore 134. A second plunger 136 is slidably received in bore 134 and defines a flange 138. Abuttment of flange 138 against surface 130 defines the limit of inward travel of plunger pin 136. A spring 140 bears against flange 138 to bias 136 inwardly. Spring 140 develops a relatively light biasing force.

In the second crossover position, crank arm 106 abutts 136, and the light resistance of spring 140 is felt by an operator. Similarly, in the third crossover position, crank arm 106 abutts plunger 126, and the heavy resistance of spring 132 is felt by an operator. In the fourth crossover position, plunger 126 has been moved outwardly away from stop 128, but has not yet bottomed out against surface 124. This allows slight overtravel of crank arm 106 beyond the fourth position in a manner similar to the opposite overtravel allowed by pin 112. Overtravel beyond the fourth position does not move finger 65 out of alignment with lever 72.

In operation, assume that a shift stick is in the neutral position illustrated in FIG. 10. Crank 104 is in the position shown in FIG. 7. Selector mechanism 64 is in the position shown in FIG. 3, and linkage assembly 70 is in the position shown in FIG. 1. Roller 82 is in contact with surfaces 90 of cam slot 88, thereby locking lever 84.

Crossover movement of a shift stick leftwardly as illustrated in FIG. 10 pivots crank 104 to the first crossover position shown in FIG. 6. Shift rail 62 rotates, thereby rotating selector mechanism 64 in the counterclockwise direction as shown in FIG. 3 until finger 65 is in alignment with a slot in shift fork 66. Engaging movement of the shift stick upwardly or downwardly as shown in FIG. 10 respectively moves shift rail 62 rearwardly or forwardly as shown in FIG. 1. Finger 65 carries shift fork 66 with shift rail 62, thereby respectively engaging gear 24 or gear 22 with mainshaft 18 to establish the first or second forward gear ratio.

Crossover movement of the shift back to the neutral position illustrated in FIG. 10 returns crank 104 to the second crossover position shown in FIG. 7, and returns selector mechanism 64 to the position shown in FIG. 3 where finger 65 is in alignment with a slot in shift fork 68. Engaging movement of the shift stick upwardly or downwardly as illustrated in FIG. 10 respectively moves shift rail 62 rearwardly or forwardly as shown in FIG. 1. Finger 65 carries shift fork 68 with shift rail 62, thereby respectively engaging gear 20 or gear 26 with mainshaft 18 to establish the third or fourth gear ratio.

Crossover movement of the shift stick rightwardly from neutral as illustrated in FIG. 10 pivots crank 104 against plunger 136 and the light resisting force of spring 132 to the third crossover position shown in FIG. 8, where crank arm 106 abutts plunger 126. Selector mechanism 64 is rotated in the clockwise direction as shown in FIG. 3, and finger 65 is moved into alignment with a slot in lever 72. Movement of the shift sitck upwardly as illustrated in FIG. 10 moves shift rail 62 rearwardly as shown in FIG. 1. Finger 65 pivots lever 72 clockwise about fulcrum 74. Shift rail 96 thus is moved in the forward direction, and shift fork 100 engages gear 42 with countershaft 30, thereby establishing the fifth gear ratio. Roller 82 moves along surfaces 90 of cam slot 88. As surfaces 90 have a center of curvature on fulcrum 74, lever 84 remains locked.

Engaging movement of the shift stick downwardly as illustrated in FIG. 10 is blocked by pin 114 so long as crank 104 remains in the third crossover position. Slight additional crossover of the shift stick rightwardly as illustrated in FIG. 10 is required to pivot crank arm 106 against plunger 126 and the heavy resisting force of spring 132 to the fourth crossover position. In this position, tab 110 abutts flat surface 116 and finger 65 remains in alignment with lever 72. The shift stick now may be moved downwardly (FIG. 10). Shift rail 62 moves forwardly (FIG. 1). Tab 110 slides along surface 116 and finger 65 pivots lever 72 counterclockwise about fulcrum 74, thereby wedging lever 84 clockwise about fulcrum 86. Pad 94 moves reverse idler gear 46 forwardly into mesh with gears 38 and 52, thereby establishing reverse gear ratio. As surfaces 80 of cam slot 76 have a center of curvature on fulcrum 74, relative movement of roller 98 in cam slot 76 does not move shift rail 96 forwardly.

In the preferred form of the invention disclosed herein, crank 104 pivots 21 degrees between its first and second crossover positions, 21 degrees between its second and third crossover positions, and five degrees between its third and fourth crossover positions. Overtravel allowed by pin 112 and surface 124 is two degrees beyond the first and fourth crossover positions, respectively. Spring 132 may provide a heavy biasing force of 30 pounds, and spring 140 a light biasing force of 10 pounds.

In the preferred form of the invention, the first three forward gear ratios establish reductions of 4.07, 2,57, and 1.66. The fourth forward gear ratio establishes direct drive, the fifth forward gear ratio establishes 0.80 overdrive, and the reverse gear ratio establishes a reduction of 3.95.

Although the shift control apparatus has been disclosed herein for use in conjunction with a transmission having five forward speed ratios and a reverse speed ratio, it is readily adapted for use in other transmissions, with or without overdrive.

While a preferred embodiment of the invention has been shown and described, this should be considered illustrative and may be modified by those skilled in the art. It is intended that the claims herein cover all such modifications as may fall within the spirit and scope of the invention.

What is claimed is:

1. In a multiple speed ratio power transmission having gear ratios selectively engageable for defining torque delivery paths between an input member and an output member, and shift control means for selectively engaging gear ratios; the improvement wherein said shift control means comprises first engaging means slidable in one direction for engaging one gear ratio, second engaging means slidable in said one direction for engaging another gear ratio, and linkage means, said linkage means including a first lever pivotal about a first fulcrum between an intermediate position and first and second extreme positions, a second lever pivotal about a second fulcrum between third and fourth extreme positions, said levers being constructed and arranged such that said second lever is in said third extreme position when said first lever is in said intermediate and first extreme positions, said first lever and said first engaging means defining first camming means for sliding said first engaging means in said one direction in response to pivoting of said first lever from said intermediate position to said first extreme position, and said first and second levers defining second camming means for sliding said second engaging means in said one direction in response to pivoting of said first lever from said intermediate position to said second extreme position.

2. The invention of claim 1, said first camming means preventing sliding of said first engaging means in said one direction as said first lever pivots between said intermediate and second extreme positions, and said second camming means preventing sliding of said second engaging means as said first lever moves between said intermediate and first extreme positions.

3. The invention of claim 1, said first camming means including a first cam slot defined by said first lever and a first cam follower connected to said first engaging means, said first cam slot having first wedging surface means contacting said cam follower for camming said first cam follower in said one direction as said first lever pivots from said intermediate position to said first extreme position, said first cam slot having first non-wedging surface means contacting said cam follower as said first lever pivots between said intermediate and second extreme positions, said first non-wedging surface means having a center of curvature on said first fulcrum, and said second camming means including a second cam slot defined by said second lever and a second cam follower connected to said first lever, said second cam slot having second non-wedging surface means contacted by said second cam follower as said first pivots between said intermediate and first extreme positions, said second non-wedging surface means having a center of curvature on said first fulcrum as said first lever pivots between said intermediate and first extreme positions, said second cam slot having second wedging surface means contacted by said second cam follower as said first lever pivots from said intermediate position to said second extreme position for pivoting said second lever from said third extreme position to said fourth extreme position, thereby sliding said second engaging means in said one direction.

4. The invention of claim 1, wherein said shift control means further comprises other engaging means slidable from intermediate positions thereof in said one direction for engaging other gear ratios and in the opposite direction for engaging still other gear ratios, selector means rotatable into selective engagement with said first lever and said other engaging means when in said intermediate positions, and means for rotating said selector means and for sliding said selector means selectively in said one and opposite directions, sliding of said selector means in said one and opposite directions when engaged with said first lever effecting pivoting of said first lever about said first fulcrum respectively toward said second and first extreme positions.

5. The invention of claim 4, said other engaging means including two other engaging means, said rotating and sliding means including a shift rail, crank means connected to said shift rail, said crank means being pivotal about the axis of said shift rail for rotating said shift rail and being slidable for sliding said shift rail, said crank means being pivotal to first, second third and fourth crossover positions, said selector means being rotatable into engagement with said two other engaging means respectively in response to pivoting of said crank means to said first and second crossover positions, said selector means being rotatable into engagement with said first lever in response to pivoting of said crank means to said third and fourth crossover positions, and stop means for blocking sliding of said shift rail in said one direction when said crank means is in said third crossover position.

6. The invention of claim 5, said stop means blocking sliding of said crank means in said one direction when said crank means is in said third crossover position.

7. The invention of claims 5 or 6, said rotating and sliding means including inhibiting means yieldably resisting pivoting of said crank means from said second crossover position to said third crossover position with a relatively light force and from said third crossover position to said fourth crossover position with a relatively heavy force.

8. In combination, a housing, a member in said housing pivotal about an axis between first, second, third and fourth positions, said member being axially slidable, inhibiting means including first resilient means resisting pivoting of said member from said second position to said third position with a relatively light force, second resilient means resisting pivoting of said member from said third position to said fourth position with a relatively heavy force, and means secured to said housing for blocking sliding of said member in one axial direction when said member is in said third position.

9. The invention of claim 8, said member being pivotal slightly beyond said first position in one direction and slightly beyond said fourth position in the opposite direction, means secured to said housing for allowing said slight pivoting in said one direction and for blocking further pivoting in said one direction, said inhibiting means allowing said slight pivoting in said opposite direction and blocking further pivoting in said opposite direction.

10. A transmission comprising an input shaft, an output shaft, an input gear connected to said input shaft, first, second and third output gears rotatably supported on said output shaft, a fourth output gear connected to said output shaft, a countershaft, drive, first, second, third and reverse countershaft gears connected to said countershaft with said drive gear engaging said input gear and said first, second and third countershaft gears respectively engaging said first, second and third output gears, a fourth countershaft gear rotatably supported on said countershaft and engaging said fourth output gear, a first synchronizing clutch supported by said output shaft and including a first collar shiftable in first and second directions respectively for connecting said first and second output gears to said output shaft, a reverse output gear connected to said first collar, a second synchronizing clutch supported by said output shaft and including a second collar shiftable in said first and second directions respectively for connecting said third output gear and said input gear to said output shaft, a third synchronizing clutch supported by said countershaft and including a third collar shiftable in said second direction for connecting said fourth countershaft gear to said countershaft, a reverse idler shaft, a reverse idler gear rotatably supported on said reverse idler shaft and shiftable in said second direction for engagement with said reverse countershaft gear and said reverse output gear, and means for selectively shifting said first, second and third synchronizing clutches and said reverse idler gear, said shifting means including first shift means engaged with said first synchronizing clutch, second shift means engaged with said second synchronizing clutch, third shift means engaged with said third synchronizing clutch and said reverse idler gear, a main shift rail rotatable to first, second, third and fourth crossover positions, said main shift rail being slidable in said first direction when in said first, second and third crossover positions and being slidable in said second direction when in said first, second and fourth crossover positions, means blocking sliding of said main shift rail in said second direction when in said third crossover position, selector means connected to said main shift rail and rotatable therewith for engagement with said first and second shift means respectively when in said first and second crossover positions and for engagement with said third means when in both of said third and fourth crossover positions, said shifting means being constructed and arranged such that sliding of said main shift rail in said first direction when in said first, second and third crossover positions respectively shifts said first and second synchronizing clutches in said first direction and said third synchronizing clutch in said second direction, and sliding of said main shift rail in said second direction when in said first, second and fourth crossover positions respectively shifts said first and second synchronizing clutches and said reverse idler gear in said second direction.

11. The invention of claim 10, said shifting means being further constructed and arranged such that shifting of said reverse idler gear is prevented when said main shift rail is in said first, second and third crossover positions.

12. The invention of claim 11, said shifting means being further constructed and arranged such that shifting of said reverse idler gear is prevented when said main shift rail is in said third crossover in said first direction.

13. The invention of claim 10, said third shift means including first and second levers respectively pivotal about first and second fulcrums, said first lever being engaged by said selector means when said main shift rail is in said third and fourth crossover positions, a slidable auxiliary shift rail engaged with said third synchronizing clutch, said second lever being engaged with said reverse idler gear, said first lever and said auxiliary shift rail defining first camming means for sliding said auxiliary shift rail in said second direction in response to sliding of said main shift rail in said first direction, and said first and second levers defining second camming means for sliding said reverse idler gear in said second direction in response to sliding of said main shift rail in said second direction.

14. The invention of claim 10, said shifting means further including inhibiting means for yieldably resisting rotation of said main shift rail from said second crossover position to said third crossover position with a relatively light force and for resisting rotation of said main shift rail from said third crossover position to said fourth crossover position with a relatively heavy force.

* * * * *